United States Patent [19]

Naef

[11] 4,104,883
[45] Aug. 8, 1978

[54] MASS TRANSPORT HEAT EXCHANGER METHOD AND APPARATUS FOR USE IN OCEAN THERMAL ENERGY EXCHANGE POWER PLANTS

[75] Inventor: Frederick E. Naef, Reston, Va.

[73] Assignee: The United States of America as represented by the Secretary of the Navy, Washington, D.C.

[21] Appl. No.: 801,180

[22] Filed: May 27, 1977

[51] Int. Cl.² ............................ F01K 9/00; F03G 7/04
[52] U.S. Cl. ........................................ 60/641; 60/692; 165/104 S; 165/107 R
[58] Field of Search ................. 60/641, 690, 691, 692, 60/693; 165/104 S, 107, DIG. 4

[56] References Cited

U.S. PATENT DOCUMENTS

| 2,846,421 | 8/1958 | Pollock | 165/104 S |
| 3,596,713 | 8/1971 | Katz | 165/107 |
| 4,014,279 | 3/1977 | Pearson | 60/641 X |

Primary Examiner—Allen M. Ostrager
Attorney, Agent, or Firm—Richard S. Sciascia; Paul N. Critchlow

[57] ABSTRACT

Ocean thermal energy conversion (OTEC) uses a fluid, such as ammonia, heated by high-temperature surface water to provide a turbine-driving working gas. To condense the gas for re-use, a slurry of phase-transformation particles and cold ambient sea water is mixed in a deeply-submerged tank and delivered to a surface tank essentially at the cold sub-surface temperature. Condensing of the working gas is performed at the ocean surface level by exposure to the cold slurry temperature. Particle phase-transformation, which occurs at a temperature between that of the cold sub-surface water and the reject temperature of the heat-exchanger, maintains a surface tank temperature at about the sub-surface water.

12 Claims, 2 Drawing Figures

U.S. Patent  Aug. 8, 1978  4,104,883
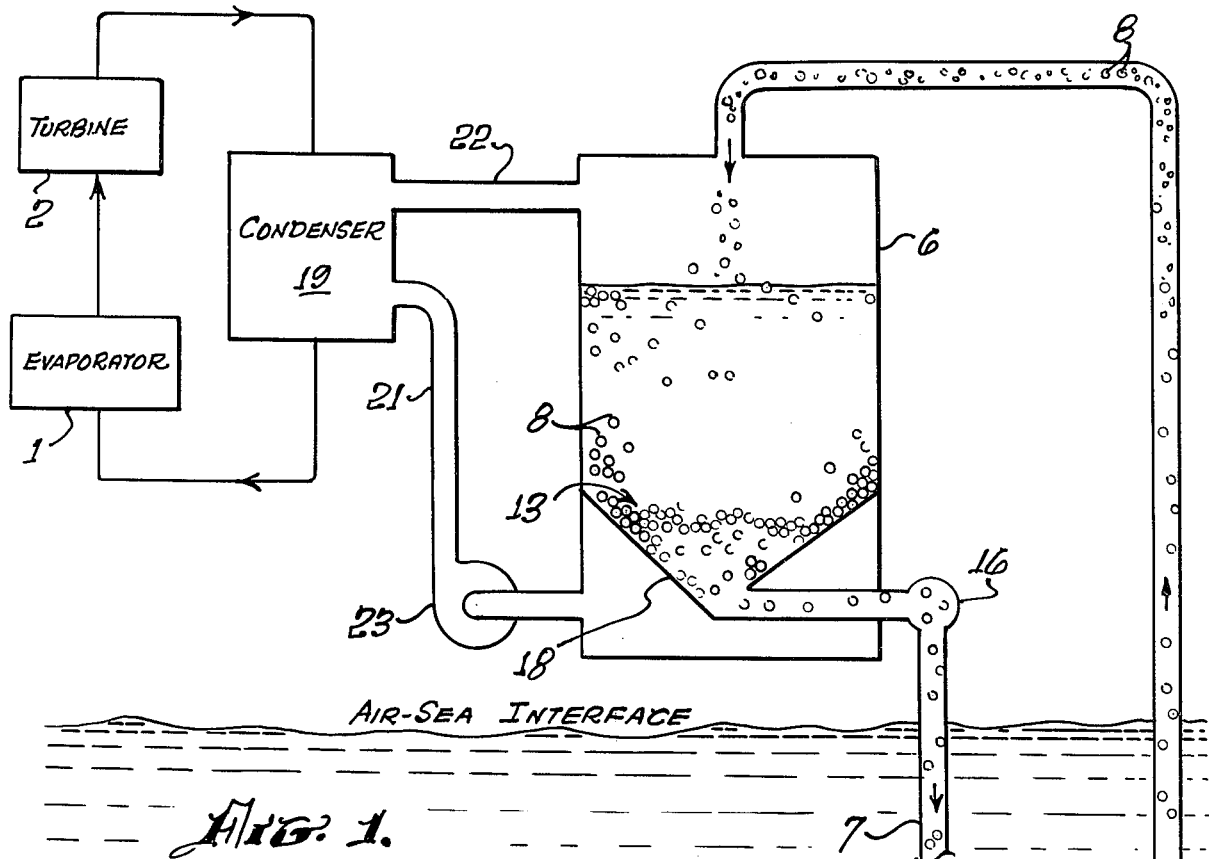
FIG. 1.
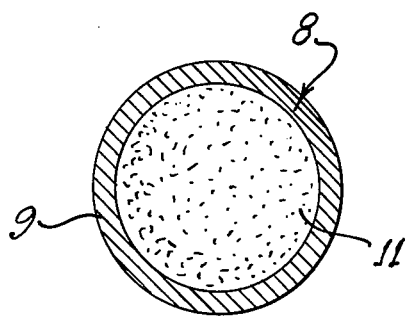
FIG. 2.
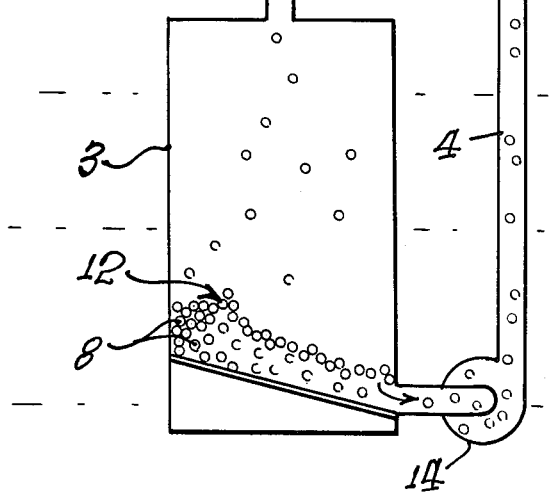

MASS TRANSPORT HEAT EXCHANGER METHOD AND APPARATUS FOR USE IN OCEAN THERMAL ENERGY EXCHANGE POWER PLANTS

It is to be noted that the present invention has been developed with the support of the National Science Foundation.

BACKGROUND OF THE INVENTION

The present invention relates to heat-exchange systems and, in particular, to systems for condensing the working gas of ocean thermal exchange power plants.

Although due to its almost unlimited availability and relative cleanliness, the use of ocean thermal energy as a power source is unusually attractive, there are a number of serious problems and difficulties which must be resolved if practical, cost-effective systems are to be widely used. In these systems which are known by the acronym OTEC, a working gas, such as the ammonia or propane, initially is heated by surface water temperatures to form a gas for driving turbines that produce electrical power for transmission to shore stations. The gas then is condensed for return to the evaporator, the condensing being achieved by using the cold temperature of relatively deep ocean water.

One of the more difficult problems involves the huge amounts of cold sea water which must be provided to the condenser heat-exchanger and the fact that these amounts either must be pumped to the surface from ocean depths or the heat-exchanger itself must be placed deep in the ocean. The requirement for large amounts of condensing sea water exists because of the small temperature differential and consequently low thermal efficiency. The system requires extremely large heat transfer surfaces which necessitate heat exchangers approximately the size of a seven story building. The pump requirements, piping size, drag forces, etc. must be commensurably large. The alternate system in which the large heat-exchanger is placed at the cold water depth presents other problems such as the need to move the working gas from the surface to the depth and to return the condensed fluid back to the evaporator at the surface. Another difficult problem is that the large heat-exchange structures must be firmly secured in the ocean depth and this need, aside from the resulting expense of the structure, seriously complicates maintenance and repairs.

Operation of OTEC systems in the ocean water involves a further complication in that the tubes of the heat-exchanger are susceptible to bio-fouling which results from bio-activity promoted by the nutrients present in the cold, sub-surface water. Bio-fouling of heat-exchanger tubes materially reduces or degrades their effectiveness so that steps must be taken either to avoid or to remove the bio-fouling during operation. In fact, this fouling is one of the largest problems facing the industry. Also, it is one that is endemic in that the nutrient gradient exists at the ocean depths where the essential cold water is found.

It is therefore an object of the present invention to provide an ocean thermal exchange system in which the size and the cost of the pumping, piping and the heat-exchange structure are effectively reduced.

Another object is to reduce the amounts of cold sea water transported to the surface, thus reducing size, costs and power requirements.

A further object is to increase the efficiency of these systems by applying material phase transformation phenomena to the heat-exchange operations.

Still another object is to provide a system which, in effect, is self cleaning insofar as bio-fouling is involved.

Other objects will become more apparent in the ensuing description.

Generally, the objects are achieved by employing a slurry of particles which undergo a phase transformation, such as a solid-liquid transformation, at a temperature between that of the cold, subsurface water and the condenser reject temperature. The slurry is formed by mixing the particles with cold sea water at the depth of the cold water and by delivering the slurry to the ocean surface where its coldness is used to condense the working gas of the energy conversion systems. Release of latent heat of fusion helps to maintain the cold water wter temperature. Use of the slurry minimizes the amounts of cold water pumped to the surface and it reduces size requirements, costs and parasitic pumping losses.

BRIEF DESCRIPTION OF THE DRAWINGS

The present invention is illustrated in the accompanying drawings of which:

FIG. 1 is a schematic illustration of one form of the present system, and

FIG. 2 is an enlarged sectional view of one of the phase-transformation particles.

DETAILED DESCRIPTION OF THE INVENTION

OTEC systems are rather well known and have been described in numerous publications. They use a working gas, such as ammonia or propane, supplied in a liquid form to an evaporator identified in the present drawing by numeral 1. The ammonia is heated by warm 80° F surface water to convert it to a gas which drives a turbine 2. The generated turbine power is transmitted to shore stations for consumer use.

A problem with which the present invention is particularly concerned involves the need to condense the gas effluent of the turbine back to liquid form for re-cycling through the evaporator. Conventionally, the cold temperature needed to condense the working gas from the turbine is supplied by extending an extremely large pipe to a depth of perhaps 2,000 feet to permit the cold water at that depth to be pumped to the condenser. Since as has been indicated, the condenser or heat-exchanger of conventional systems is about the size of a seven story building, it is apparent that huge amounts of water must be pumped from the depth to the surface and that the piping as well as the pumping must have extremely large capacities. The evaporator, the turbine and the condenser usually are carried on a floating barge or the like directly above the cold water pipe which extends to the cold water depth.

The present invention is characterized by the fact that, instead of pumping copious supplies of cold water to the surface, the system employs a slurry formed of sea water and a large supply of pellets or particles which, preferably, have about a neutral buoyancy to minimize pumping requirements. As shown, it employs a sub-surface tank 3 connected by a delivery pipe 4 to a surface tank 6. A return line 7 communicates the lower portion of tank 6 to the upper portion of sub-surface tank 3.

Contained within both tanks 3 and 6 are beds of particles 8 which, for present purposes, can be visualized as relatively large pellets or capsules of perhaps the size of a golf ball. Preferably, each of these particles 8, is a spherical capsule (FIG. 2) having an outer protective shell 9 encapsulating a material 11 which is a phase transformation material capable of undergoing a phase change at a particular temperature. For example, material 11 may be the common heat exchange material NaK which is soft, silvery, solid or liquid sodium-potassium alloy which undergoes a solid-to-liquid phase transformation in a 40°–60° F range. Shell 9 can be formed of a plastic, ceramic, glass, or, if extra protection is needed, of steel or other relatively strong metals.

The selection of the encapsulating coating material will depend somewhat upon the phase-transformation material which is used. However, it should have a high temperature conductivity to permit the phase-transformation material to respond promptly to ambient temperatures. Some trade-off may be needed between the obvious desire to gain conductivity by reducing the shell thickness and the need to have a strong shell wall to resist wear. Another factor to be considered in the material selection is the desirability of minimizing biofouling tendencies.

Phase transformation materials are quite well known and have been used for a variety of heat-exchange purposes such, for example, as a control for the heat of chemical reactions. As stated, NaK is functionally acceptable although it also is expected that a variety of other less reactive materials, such as waxes, etc., can be used. As is known, phase-transformation with its accompanying heat release occurs not only in solid-liquid transformations but also in other types of transformations such as solid-solid or crystalline. As will become apparent, the particular type of transformation presently used is of little concern provided it is capable of releasing its latent heat at the operating temperature of the system. In this regard, it can be noted that the principal function of the capsules or pellets used in the FIG. 1 apparatus is to absorb the cold water energy during their residence time in tank 3 and to release this energy in the form of latent heat of fusion when delivered into tank 6.

Other aspects of the present invention best can be understood by considering the operation of the schematically illustrated system. As a starting point, it can be considered that sub-surface tank 3 contains a supply or bed 12 of ball-sized particles 8 and that surface tank 6 also contains a similar bed 13. The particles of sub-surface bed 12 are to be delivered to surface tank 6 and, for this purpose, a pump 14 is coupled into delivery line 4. Also, particles present in surface bed 13 are returned to sub-surface bed 12 and, as needed, another pump 16 may be coupled into return line 8. However, under certain circumstances, only one or the other of pumps 14 and 16 may be needed and, assuming appropriate particles can be found, there may be situations in which little or no pump power is required. For example, it is known that the specific gravity of encapsulated solid-state NaK particles can be about .9 so that they tend to float upwardly in delivery pipe or conduit 4. Of course, if relatively heavy casings or shells are used, some pump power may be needed although it will be considerably less than that otherwise required for the copious water deliveries. Power for returning encapsulated liquid NaK pellets from surface bed 13 also is minimized and conceivably eliminated. For example, although the particles in their liquid form are lighter, they can be returned through conduit 7 under a hydrostatic head. Further, materials may be found which have a so-called reverse phase-transformation characteristics. In other words, particles in their solid form are less dense and tend to float, while, in their liquid form, they become more dense and tend to sink. In such an event, the particles tend to float upwardly in conduit 4 and downwardly in conduit 8. In any event, particles 8 should have a near neutral buoyancy which substantially minimizes pumping requirements.

An important consideration in the present system is one of assuring that sub-surface bed 12 has a sufficiently long residence time in tank 3 to permit the particles to solidify at the temperature of the cold, sub-surface water. To achieve this purpose, tank 3 not only should be large but, in particular, the flow rate in delivery line 4 and return line 7 should be quite slow. Also, solidification time can be materially reduced by employing a pump to induce cold water circulation through the tank 3. If increased residence time is desired, several sub-surface tanks 3 can be employed. In this arrangement one or more are used as stand-by tanks while another is operatively coupled to the surface tank. Thus, the residence time can be increased relative to that achievable with a single sub-surface tank.

The physical nature of the particles being delivered from sub-surface tank 3 to the surface tank is, as already indicated, a slurry formed of both water and the golf-ball-sized pellets or particles. The slurry is formed by circulating cold ambient sea water through the particle bed in tank 3 and the particles, along with some of the water is delivered through conduit 4 to the surface tank. Preferably, the tank 3 employs an inclined baffle member 17 or the like near its bottom portion to direct the slurry into the inlet end of delivery pipe 4. At the outlet end of this pipe, the slurry is delivered into a space provided above packed bed 13. The return flow of the particles and some of the sea water is facilitated by employing another inclined baffle 18 in tank 6. This baffle is a screen-like member which permits sea water delivered to the upper portion of tank 6 to drop into the particle-free lower portion of the tank for use as a condensing medium.

A heat exchanger 19 condenses the working gas or ammonia delivered to it from evaporator 1 and turbine 2. As will be appreciated, the gas passes through the condenser in thin-walled pipes which are cooled by sea water. The sea water is supplied through a closed-loop circuit formed of an inlet pipe or conduit 21 coupled to the particle-free portion of surface tank 6 and an outlet pipe 22 which leads into the upper, empty portion of tank 6. Conduit 22 returns condenser-reject sea water to tank 6 at particular elevated temperature determined, of course, by the amount of energy extracted from the sea water for condensing purposes. A pump 23 forces the sea water in conduit 21 through the condenser and back into surface tank 6. Most suitably, the pump is controlled to provide a relatively fast flow rate in the closed loop of the sea water provided by pipes 21 and 22.

Packed bed 13 of surface tank 6, in effect, acts as a constant temperature heat sink for the condenser at a temperature that is essentially equal to that of the sub-surface water in which tank 3 is disposed. More specifically, the operation of the system contemplates delivery of the slurry into tank 6 at essentially the sub-surface temperature which may be in the range of 40–45° F and, for this purpose, pipe 4, as well as the other pipes of the system, are formed or insulated to maintain their influent temperature. Also, surface tank 6 and condenser 19 are insulated structures which, in actual practice, may be heavy concrete structures having sufficiently thick walls to maintain their interior temperatures. Even so, there will be some warming of both the particles and the water of the slurry delivered to tank 6. Also, the residence time in the tank 6 permits warming. However, efficient operation of the system requires that the slurry delivered to tank 6 be essentially the temperature of the ambient sub-surface water so that the heat of fusion is not released at least until the particles come to rest in bed 13. It is the release of this heat of fusion within packed bed 13 which is largely responsible for maintaining the bed at essentially the temperature of the ambient sub-surface water. In other words, it permits the bed to act as the constant temperature heat sink at the sub-surface temperature.

To achieve this purpose, it is preferred to use phase transformation at a temperature between that of the cold sub-surface water and that of the condenser reject water delivered to tank 6 through conduit 22. Specifically, if the sub-surface temperature is 40° and the condenser reject temperature is about 60°, the particles undergo a phase transformation within this range and, preferably, well above the 40° temperature so as to assure their solid state on arrival at the tank. The warming effects on the particles of the condenser reject water as well as other warming effects are compensated by their state change with its energy release. Consequently, the condenser water passing through screen 18 into the lower portion of tank 6 is essentially at the temperature of the sub-surface water. The flow rates both of delivery line 4 and return line 7, as well as the flow rate through the condenser are controllable for this purpose. The control achieves an optimum flow of the cold water through tank 6 and an optimum residence time of the particles within this tank. Preferably, this residence time assures the return of the particles to sub-surface tank 3 before particles become super-heated. One reason for avoiding super-heating is to reduce the residence time needed in sub-surface tank 3 to absorb the ambient temperature.

Some of the advantages inherent in the illustrated arrangement include, first, the fact that the pumping requirements for delivering the slurry to tank 6 and returning it to the sub-surface tank are reduced. The reduction is achieved by utilizing particles or pellets which have a near neutral buoyancy so that relatively little pump power is required to lift them to the surface or return them to the sub-surface. As already indicated, it is conceivable that particles 8 can be formed of appropriate materials permitting them to rise during delivery and fall during return. For example, it is known that the petroleum industry uses a fluidized technology to move catalyst beads from, for example, a reactor to the regenerator. Utilizing this technology, the specific gravity or weight of the particles can be adjusted for maximum power reductions. In this regard, however, it is assumed that pumping power will be required either for delivery or return of the slurry. In this regard, it is considered preferable to provide particles having a specific gravity permitting them to float during delivery. Pump 16 then is used to assure their return and control the flow rate.

A further advantage in the illustrated system is that heat-exchanger 19 can be of a considerably reduced size. Thus, in conventional OTEC proposals, very large volumes of water are piped at a relatively slow rate through the condensers and the condensers must have a capacity to handle this large volume. In the present system, the flow rate through the condenser is relatively fast and the lag mean temperature difference is small, permitting the same cooling effect to be accomplished with a smaller heat exchanger. Further, as is apparent, relatively little sea water is delivered through pipe 4 into the surface tank due to the fact that the flow rate through this delivery line is quite slow and that the slurry being delivered is, in large part, formed of the particles themselves.

A further important consideration involves the bio-fouling problem caused by the use of the nutrient-rich cold sea water which promotes bio-fouling. In the present system, bio-fouling is minimized first by the fact that the nutrients in the sub-surface are formed in large part on the particles themselves and that a substantial amount is returned by the particles to the sub-surface depth. Further, it is possible to clean and inspect the particles as they are delivered to tank 6 by removing increments of the incoming particles for scrubbing and replacement. The high flow rate of the sea water through the condenser has less nutrients since, as stated, a considerable amount of the nutrients are carried back to the sub-surface by the particles.

Although the system illustrated in the drawing has definite advantages, it also is contemplated that additional significant advantages can be obtained by utilizing surface tank 6 itself as a heat-exchanger. The condenser 19 could be further reduced in size and the need for condenser 19 no longer would exist. Also, the closed-loop circuit for circulating water through the separate condenser could be eliminated. Use of surface tank 6 as a heat-exchanger contemplates delivery of the working gas directly into the surface tank. In such an operation, a slurry, such as has been described, is delivered in the same manner to the tank which includes a separator, such as a rotary separator, to separate the sea water from the particles and dry the particles. The working gas or ammonia then is separated and returned to the evaporator. The particles themselves are returned in the manner already considered to the sub-surface tank. One of the advantages in such an arrangement is the further reduction and possible elimination of the heat exchanger. Another is that the system, in effect, is self-cleaning insofar as bio-fouling is involved. The self-cleaning is achieved by the fact that the spherical particles constantly are rubbing together and the nutrients carried by the particles rub off and can be eliminated. Such a system also may utilize the fluidized bed technology of the petroleum to provide a heat exchanger in the form of tank 6 in which the usual tube-type exchanger is replaced by the heat exchange pellets.

It further is to be recognized that, although the principles of the present invention generally contemplate the condensation of the ammonia gas, they also can be advantageously employed in the evaporation phase to initially provide the ammonia gas for the turbines. Thus, liquid-phase particles can be delivered in a warm water slurry to heat the liquid ammonia and produce the gas. In fact, the liquid particles can also be the NaK exchange material with the desired phase change temperature controlling the varying proportions of the sodium and potassium. Use in the evaporation phase would be particularly advantageous in an evaporation system that separates the warm slurry water from the particles and then uses the particles themselves to evaporate incoming liquid ammonia. In fact, applying the separation concept to both condensation and evaporation serves to eliminate the use of the conventional large tanks used for both condensing and evaporating.

Obviously many modifications and variations of the present invention are possible in the light of the above teachings. It is therefore to be understood that within the scope of the appended claims the invention may be practiced otherwise than as specifically described.

It is to be noted that the present invention has been developed with the support of the National Science Foundation.

I claim:

1. A method of condensing the working gas of an ocean thermal energy conversion system comprising:
   mixing in a sub-surface tank disposed at an ocean depth a supply of temperature-sensitive phase-transformation particles with cold ambient sea water for forming a slurry having a temperature essentially equal to that of the ambient water,
   delivering said cold slurry upwardly from said tank depth into a surface-disposed tank,
   returning said particles from said surface tank to said sub-surface tank,
   exposing at said surface level said working gas to the temperature of the surface tank slurry, and
   withdrawing the sea water from said surface tank and recirculating it as an influent back into said surface tank,
   said temperature-sensitive particles being of a type capable of undergoing a phase transformation at a temperature between that of said sub-surface ambient sea water and said surface tank influent.

2. The method of claim 1 wherein said particles have a near neutral buoyancy.

3. The method of claim 1 wherein said particles undergo a solid to liquid phase transformation at a temperature of from about 40° to 60° F.

4. Mass transport heat exchanging apparatus for condensing the working gas of an ocean thermal energy conversion system comprising:
   a mass of bead-like particles formed to undergo a latent heat-releasing phase transformation at a particular temperature,
   a sub-surface tank disposed in a cold water environment at a fixed ocean depth, said tank containing a fluid particle and water slurry bed at essentially the temperature of said cold water environment,
   a heat-exchanger including a second tank disposed near the ocean surface and also containing a bed of said particles,
   a mass transport conduit circuit means for controllably delivering said slurry from said subsurface tank to said surface tank and for returning said delivered particles back to said sub-surface tank whereby said circuit beds are maintained,
   a second conduit circuit means for withdrawing slurry water delivered to said surface tank and recirculating it back into the surface tank at a controlled flow rate, and
   means for exposing said working gas to the temperature of said surface tank bed for condensing said gas,
   said exposure elevating the temperature of water returned to said surface tank by said second recirculating circuit and said particles being formed to undergo a phase transformation between the temperature of said cold sub-surface water and said elevated temperature for maintaining said surface tank bed essentially at the temperature of said cold sub-surface water.

5. The apparatus of claim 4 wherein said particle phase transformation is a solid-liquid transformation.

6. The apparatus of claim 5 wherein said particles each are formed of a capsule including:
   a material characterized by its ability to undergo a solid-liquid phase transformation in said surface tank bed, and
   a capsule casing formed of a temperature-conductive material,
   said capsules having a specific gravity close to that of sea water for providing a near neutral buoyancy.

7. The apparatus of claim 5 wherein said mass transport conduit circuit means includes pump means for movably delivering said slurry to said surface tank at a controlled and relatively-slow flow rate determined in accordance with said circuit return flow rate for maintaining said beds, said particles being returned to said sub-surface tank by the hydrostatic head provided by said surface tank bed.

8. The apparatus of claim 6 wherein said capsule specific gravity is less than that of said cold sea water whereby said particles in said slurry floatably rise for delivery to said surface tank.

9. The apparatus of claim 8 wherein said mass transport conduit circuit includes a pump means for returning said particles to said sub-surface tank, pump means being controlled in accordance with the flow rate of said delivery for maintaining said particle beds.

10. The apparatus of claim 4 wherein said heat-exchanger further includes:
    a condenser tank receivably coupled to said working gas, said condenser tank being coupled into said second recirculating circuit for exposing said working gas to the cold water temperature of the water in said second circuit.

11. The apparatus of claim 10 wherein said particle bed partially fills said surface tank and both said delivered slurry and said recirculated condensing water are delivered into a space provided above the surface tank bed.

12. The apparatus of claim 11 wherein said surface tank further includes:
    a baffle member for directing said particles into the particle return portion of said mass transport conduit circuit and for separating said slurry water in said surface tank bed from said particles for delivery into said recirculating and condensing conduit.

* * * * *